R. REID.
WHEEL TIRE FOR ROAD VEHICLES.
APPLICATION FILED JUNE 20, 1910.

1,116,120.

Patented Nov. 3, 1914.

Witnesses—

Inventor—
Robert Reid,
by his Attorneys—
Howson & Howson

UNITED STATES PATENT OFFICE.

ROBERT REID, OF GLASGOW, SCOTLAND.

WHEEL-TIRE FOR ROAD-VEHICLES.

1,116,120.  Specification of Letters Patent.  Patented Nov. 3, 1914.

Application filed June 20, 1910. Serial No. 567,973.

*To all whom it may concern:*

Be it known that I, ROBERT REID, manager, a subject of the King of Great Britain and Ireland, and a resident of Glasgow, Scotland, have invented new and useful Improvements in Wheel-Tires for Road-Vehicles, of which the following is a specification.

This invention has reference to and comprises improvements in wheel tires of the solid or cushion class for road vehicles.

In order that my said invention and the manner of carrying same into effect or practice may be properly understood, I have hereunto appended one sheet of explanatory drawings in which—

Figure 1:
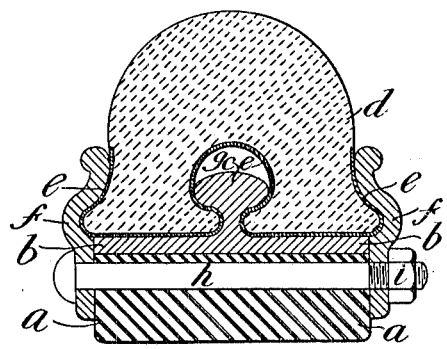
Figure 2:
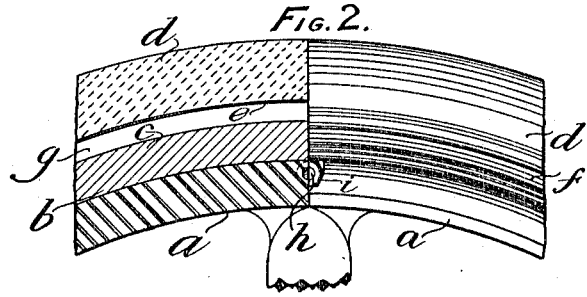
Figure 3:
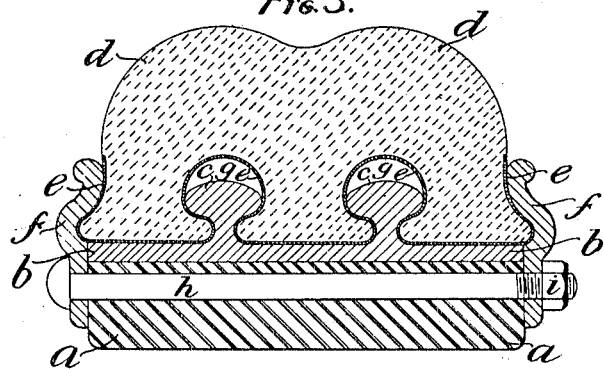

Figure 1 is a transverse sectional elevation of a wheel tire of the solid or cushion class as constructed according to my improvements and Fig. 2 is a side elevation partly in section and to a reduced scale of a portion of wheel tire shown by Fig. 1; while Fig. 3 is a transverse elevation similar to Fig. 1, but showing a slightly modified construction which will be hereinafter referred to.

Referring to these drawings:—According to my improvements I fit around the wooden felly *a* of the wheel a steel or iron band *b* formed at its center part with an outwardly projecting annular flange *c* of a shape resembling the upper part of a permanent way rail which is bulbous in cross section. The rubber tire *d*, which may be fitted with a canvas base *e* would be of a formation that would bear over the band *b* and fit between ring-clamp flanges *f* on each side of felly *a* and be clenched between these and the curved surfaces on each side of the central annular flange *c*. The tire *d* would curve around above the center flange *c* and a hollow cushioning space *g* would be formed between the outer surface of knob *c* and the inner central surface of tire *d*.

In the construction shown by Fig. 3 two outwardly projecting annular flange knobs *c* are formed on the band *b* so that two hollow cushioning spaces *g* are formed between the outer surfaces of the flanges and the inner surface of tire. The side metal flanges *f* would bear on each side of tire *d* and band *b* and be secured by screwed bolts *h* and nuts *i* at spaced distances apart to the wooden felly *a*.

What I claim as my invention and desire to secure by Letters Patent is:—

1. The combination of a wheel; a band secured to the felly having an integral central annular flange; and an integral head of bulbous cross section extending continuously around the extreme outer portion of said flange; and a tire mounted on the band and having a groove adapted to inclose the annular flange, said groove being of greater depth than the flange and providing an air space between the extreme outer portion of the head and the tire.

2. The combination of a wheel; a band secured to the felly of the wheel and having an under-cut integral central annular flange projecting therefrom; a flanged tire mounted on the band and having a groove shaped to inclose the annular flange, said groove being of greater depth than the flange and providing an air space between the extreme outer portion of the latter and the tire; with clamp-rings secured to the felly on the sides of the wheel and each having a groove of substantially the same width as that of the under-cut annular flange, the flanges of the said tire being shaped to enter the grooves of the clamp-rings and the under-cut portion of the annular flanges respectively.

3. The combination of a wheel; a band detachably secured to the felly of the wheel and having a plurality of annular headed flanges projecting therefrom, the head of each of said flanges being bulbous in cross section; with a tire mounted on the band and having grooves shaped to inclose said flanges, said grooves being of a greater depth than the latter and providing an air space between the extreme outer portions of each of the heads and the tire.

In testimony whereof, I have signed my name to this specification, in the presence of two subscribing witnesses.

ROBERT REID.

Witnesses:
 R. C. THOMSON,
 T. BENNIE BROWNLIE.